(12) United States Patent
Persson et al.

(10) Patent No.: US 7,248,874 B2
(45) Date of Patent: Jul. 24, 2007

(54) MOBILE ASSISTED HANDOVER USING CDMA

(75) Inventors: Bengt Yngve Persson, Djursholm (SE); Björn Gudmundson, Sollentuna (SE); Paul Wilkinson Dent, Research Triangle Park, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 593 days.

(21) Appl. No.: 10/651,880

(22) Filed: Aug. 29, 2003

(65) Prior Publication Data
US 2004/0038682 A1   Feb. 26, 2004

Related U.S. Application Data

(60) Division of application No. 08/384,456, filed on Feb. 2, 1995, which is a continuation of application No. 07/870,337, filed on Apr. 17, 1992, now abandoned.

(51) Int. Cl.
*H04Q 7/20* (2006.01)

(52) U.S. Cl. .............. 455/437; 455/442; 370/331; 370/335

(58) Field of Classification Search ............ 455/422.1, 455/436, 437, 438, 439, 442, 443, 444, 450, 455/524, 525, 561; 370/331, 332, 335, 342
See application file for complete search history.

(56) References Cited

U.S. PATENT DOCUMENTS

| | | | |
|---|---|---|---|
| 4,134,071 A | 1/1979 | Ohnsorge | |
| 4,293,953 A | 10/1981 | Gutleber | |
| 4,470,138 A | 9/1984 | Gutleber | |
| 4,644,560 A | 2/1987 | Torre et al. | |
| 4,901,307 A | 2/1990 | Gilhousen et al. | |
| 4,930,140 A | 5/1990 | Cripps et al. | |
| 4,984,247 A | 1/1991 | Kaufmann et al. | |
| 5,022,049 A | 6/1991 | Abrahamson et al. | |
| 5,042,082 A * | 8/1991 | Dahlin ........................ 455/437 |
| 5,048,059 A | 9/1991 | Dent | |
| 5,056,109 A | 10/1991 | Gilhousen et al. | |

(Continued)

FOREIGN PATENT DOCUMENTS

EP    400314    5/1990

(Continued)

OTHER PUBLICATIONS

Viterbi, A. "Very Low Rate Convolutional Codes for Maximum Theoretical Peformance of Spread-Spectrum Multiple-Access Channels." IEEE Journal on Selected Areas in Communications, vol. 8, No. 4, May 1990.

(Continued)

*Primary Examiner*—Quochien B. Vuong
(74) *Attorney, Agent, or Firm*—Coats & Bennett, P.L.L.C.

(57) ABSTRACT

A mobile station assists the wireless network with handover from a first base station to a second base station. The mobile station receives transmissions from the first base station using a first spreading code corresponding to the first base station while receiving signals from at least one other base station. The mobile station determines the relative signal strengths of the signals received from the other base stations and reports the relative signal strengths to the first base station to support handover determinations by the wireless network.

23 Claims, 3 Drawing Sheets

U.S. PATENT DOCUMENTS

| | | | |
|---|---|---|---|
| 5,091,942 A | | 2/1992 | Dent |
| 5,101,501 A | * | 3/1992 | Gilhousen et al. .......... 455/442 |
| 5,103,459 A | | 4/1992 | Gilhousen et al. |
| 5,109,390 A | | 4/1992 | Gilhousen et al. |
| 5,128,959 A | | 7/1992 | Bruckert |
| 5,150,075 A | * | 9/1992 | Hietala et al. .............. 330/279 |
| 5,151,919 A | | 9/1992 | Dent |
| 5,159,608 A | | 10/1992 | Falconer et al. |
| 5,179,571 A | | 1/1993 | Schilling |
| 5,184,347 A | * | 2/1993 | Farwell et al. .............. 455/442 |
| 5,218,619 A | | 6/1993 | Dent |
| 5,237,586 A | | 8/1993 | Bottomley |
| 5,239,557 A | | 8/1993 | Dent |
| 5,239,682 A | * | 8/1993 | Strawcynski et al. ....... 455/436 |
| 5,267,261 A | * | 11/1993 | Blakeney et al. ........... 370/332 |
| 5,285,447 A | * | 2/1994 | Hulsebosch ................. 370/332 |
| 5,295,152 A | | 3/1994 | Gudmundson et al. |
| 5,295,153 A | | 3/1994 | Gudmundson |
| 5,345,598 A | | 9/1994 | Dent |
| 5,353,352 A | | 10/1994 | Dent et al. |
| 5,377,183 A | | 12/1994 | Dent |
| 5,430,760 A | | 7/1995 | Dent |

FOREIGN PATENT DOCUMENTS

| | | |
|---|---|---|
| JP | 2044929 | 2/1990 |
| WO | 90/13187 | 11/1990 |
| WO | 91/07020 | 5/1991 |

OTHER PUBLICATIONS

Kerdock, A. "A class of Low-Rate Nonlinear Binary Codes." Information and Control, vol. 20, pp. 182-187 (1972).

MacWilliams, F. The Theory of Error-Correcting Codes, Part I and II, New York: North-Holland, 1988, pp. 93-124, 451-465.

Varanasi, Makesh K. et al. "An Iterative Detector for Asynchronous Spread-Spectrum Mulitple-Acces Systems." IEEE Global Telecommunication Conference & Exhibition, Hollywood, Florida, Nov. 28-Dec. 1, 1988, vol. 1 of 3, pp. 556-560.

Masamura, Tatsuro. "Spread Spectrum Multiple Access System with Intrasystem Interference Cancellation." The Transactions of the IEICE, vol. E71, No. 3 Mar. 1988, pp. 224-231.

Kohno, Ryuji et al. "Adaptive Cancellation of Interference in Direct-Sequence spread-Spectrum Multiple Access Systems." IEEE/IEICE Global Telecommunications Conference, 1987, Conference Record vol. 1 of 3, Nov. 15-18, 1987, Tokyo, Japan, pp. 630-635.

* cited by examiner

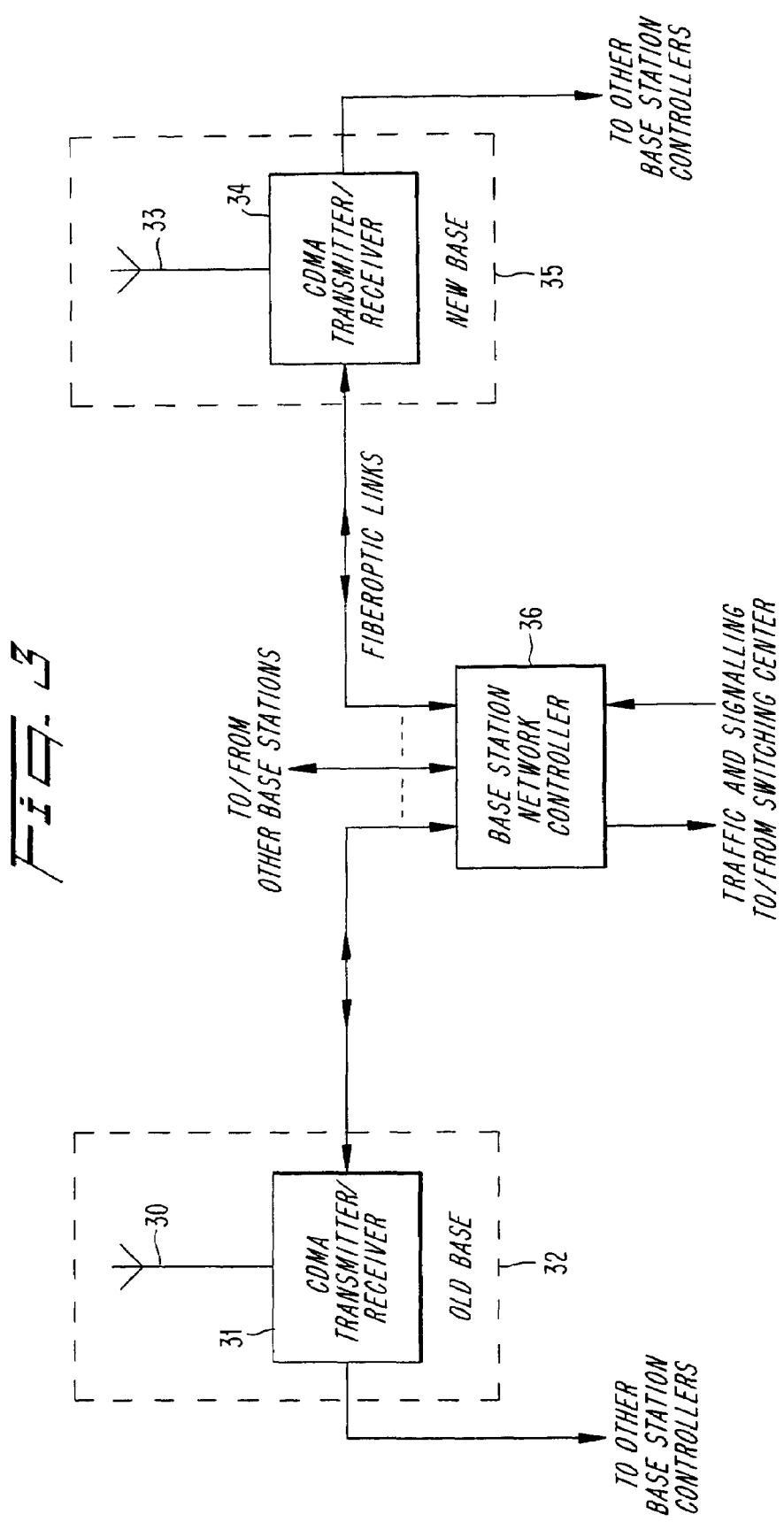

MOBILE ASSISTED HANDOVER USING CDMA

CROSS-REFERENCE TO RELATED APPLICATIONS

The present application is a divisional application of U.S. application Ser. No. 08/384,456, filed 2 Feb. 1995, pending. The present application further claims priority from U.S. application Ser. No. 07/870,337 filed 17 Apr. 1992, abandoned.

BACKGROUND OF THE INVENTION

In mobile radio telephone systems, the capability is provided to transfer the handling of communications with a mobile station from one base station to another, as the mobile station changes its position and so moves out of the coverage range of one base station and into the coverage area of another base station. This process is commonly termed handover or handoff.

To smoothly complete a handover, the network controlling the base stations must first determine, for each mobile station, whether the need for handover is imminent and secondly determine to which new base station handover should be effected. In making the latter decision it is desirable that the network controller know either how well each base station can receive signals from a mobile station in question, or how well the mobile station in question can receive signals from each base station, or both. The present invention provides a method for the base station to acquire this information using a code division multiple access (CDMA) transmission method.

Conventional mobile telephone systems were based largely on Frequency Division Multiple Access (FDMA), in which each mobile station transmits on a unique frequency within its current base station area. The mobile station is thus unaware of signals on other frequencies from surrounding bases. In FDMA systems it would be too costly to equip mobile stations with an extra receiver that could be used to scan other base frequencies. Instead, it is established practice that base stations are equipped with a scanning receiver that looks out for the signals of approaching mobile stations. The network then hands over a mobile from a base station covering an area it is leaving to the base station that reports the base reception of the mobile station's signal.

More recent cellular telephone standards employ Time Division Multiple Access (TDMA) in which a fixed time period (e.g., 20 mS) on each radio frequency is divided into a number (e.g., 3) of short timeslots (e.g., 6.6 mS) that are cyclically used by different mobile stations. Thus, a first mobile station transmits in the first timeslot in each period, a second mobile station transmits in the second timeslot in each period and so on. Likewise the base station transmits to one mobile station in the first timeslot, another mobile station in the second slot and so on. By offsetting the allocation of timeslots in the two communications directions, base to mobile (the downlink) and mobile to base (the uplink), it can be arranged that a first mobile transmits in the first timeslot and receives in the second timeslot; a second mobile transmits in the second timeslot and receives in the third, while a third mobile transmits in the third timeslot and receives in the first timeslot. An advantage of this arrangement is that a mobile station does not need to transmit and receive simultaneously, which facilitates sharing a single antenna.

In the above three-timeslot example, each mobile station is active to transmit or receive in two of the three timeslots and idle in the remaining timeslot. Therefore it is possible for TDMA mobile stations to use this idle time to search for signals from other base stations and measure their signal strength. By reporting these signal strength measurements to the base station using a slow speed data channel multiplexed with the traffic (i.e., voice), the network is informed about the base stations each mobile station can receive. The network can use this information to effect handover to the best base station, and such a system is termed mobile assisted handover (MAHO). When the base stations scan for the signal strength of mobile stations, the system could be termed base assisted handover (BHAO).

Systems providing MAHO also have access to the base station measurements, and so are able to effect another and more reliable handovers because both uplink and downlink signal strengths are taken into account, instead of just uplink strengths in the case of BAHO. However, these conventional systems have a number of limitations. For example, MAHO has conventionally only been used in TDMA systems. TDMA systems, however, involve a certain waste of capacity due to the need for guard spaces between timeslots during which the mobile stations' transmitters power up and down. Moreover, in these TDMA systems with MAHO, fast frequency switching is needed to scan channels on which other base stations are transmitting during the short idle periods, which is technically difficult and adds both complexity and cost to the system. The available time in the idle slot combined with the difficulty in switching frequency rapidly permit only one neighboring base frequency to be scanned per 20 mS frame. In FDMA systems, MAHO has not been implemented because base stations in FDMA systems use different frequencies to transmit control channels than those being used by mobile stations for transmissions and FDMA mobiles cannot change frequency without loss of traffic.

The present invention uses Code Division Multiple Access (CDMA) to permit neighboring base stations to share the same frequency channel, and thus permit the mobile to assess their signal strength without changing frequency or losing traffic. Another feature of the present invention is that the signals generated by the neighboring base station to which the mobile station is being handed over comprise a diversity transmission which can be combined with the transmissions from the base station originally connected to the mobile station to improve reception quality.

Conventionally, such diversity transmissions have been provided in CDMA systems by transmitting a signal which is encoded and modulated in exactly the same way as the original signal with a relative delay of one or more chips or bits. These overlapping signals can then be combined in an echo-integrating type of receiver such as a Veterbi equalizer or a RAKE receiver.

A disadvantage of these conventional macrodiversity systems is the need to transmit from one base station the codes that are allocated being used to transmit to the mobile station to one or more other base stations. In a substrative CDMA system, this also involves informing all of the mobile stations in a cell when a diversity transmission for any mobile is initiated of the exact code that will be used.

This problem is overcome according to the present invention by using different codes for the diversity transmissions so that an originally connected base station need not transmit an allocated code to other base stations. This takes advantage of the fact that a CDMA mobile receiver is able to simultaneously receive and decode both its normally coded signal and the diversity coded signal.

BRIEF DESCRIPTION OF THE DRAWINGS

These and other objects, features, and advantages of the present invention will become more apparent by reading the following detailed description in conjunction with the drawings in which:

FIG. 3 shows a network control system for performing handovers between base stations according to the invention.

DETAILED DESCRIPTION OF THE INVENTION

The present invention will now be described in the context of a subtractive CDMA demodulation system, such as that disclosed in U.S. Pat. No. 5,151,919, entitled "CDMA Subtractive Demodulation" which issued 29 Sep. 1992, and is hereby incorporated by reference. However, those skilled in the art will readily appreciated that the present invention is applicable to any system in which adjacent base stations operate on the same frequency and use signals with coded features enabling them to be distinguished.

In the above-mentioned application, a system is described in which coded signals are scrambled with unique scrambling codes and then transmitted on the same frequency. A plurality of overlapping signals received on a single frequency channel include a number of signals within the same cell as well as a number of signals transmitted from base stations in neighboring cells. Despite overlap in time and frequency, individual signals can be selected for decoding by first descrambling the received signal with the appropriate scrambling code and then decoding the underlying information bearing code. Undesired interfering signals do not descramble to a form that correlates with the decoding and so are suppressed to a certain degree called the processing gain. An exemplary underlying information coding is bi-orthogonal or orthogonal coding using Walsh-Hadamard functions. The suppression of interference caused by the other signals transmitted on the same frequency is enhanced by the subtractive CDMA demodulation system disclosed in the aforementioned patent application by descrambling and decoding signals in signal strength order from strongest to weakest and subtracting each signal from the received composite signal as it is decoded. In that way, stronger signals do not substantially interfere with weaker ones and it is easier to then decode the weaker signals, such as might be received from more distant stations.

Figure 1:
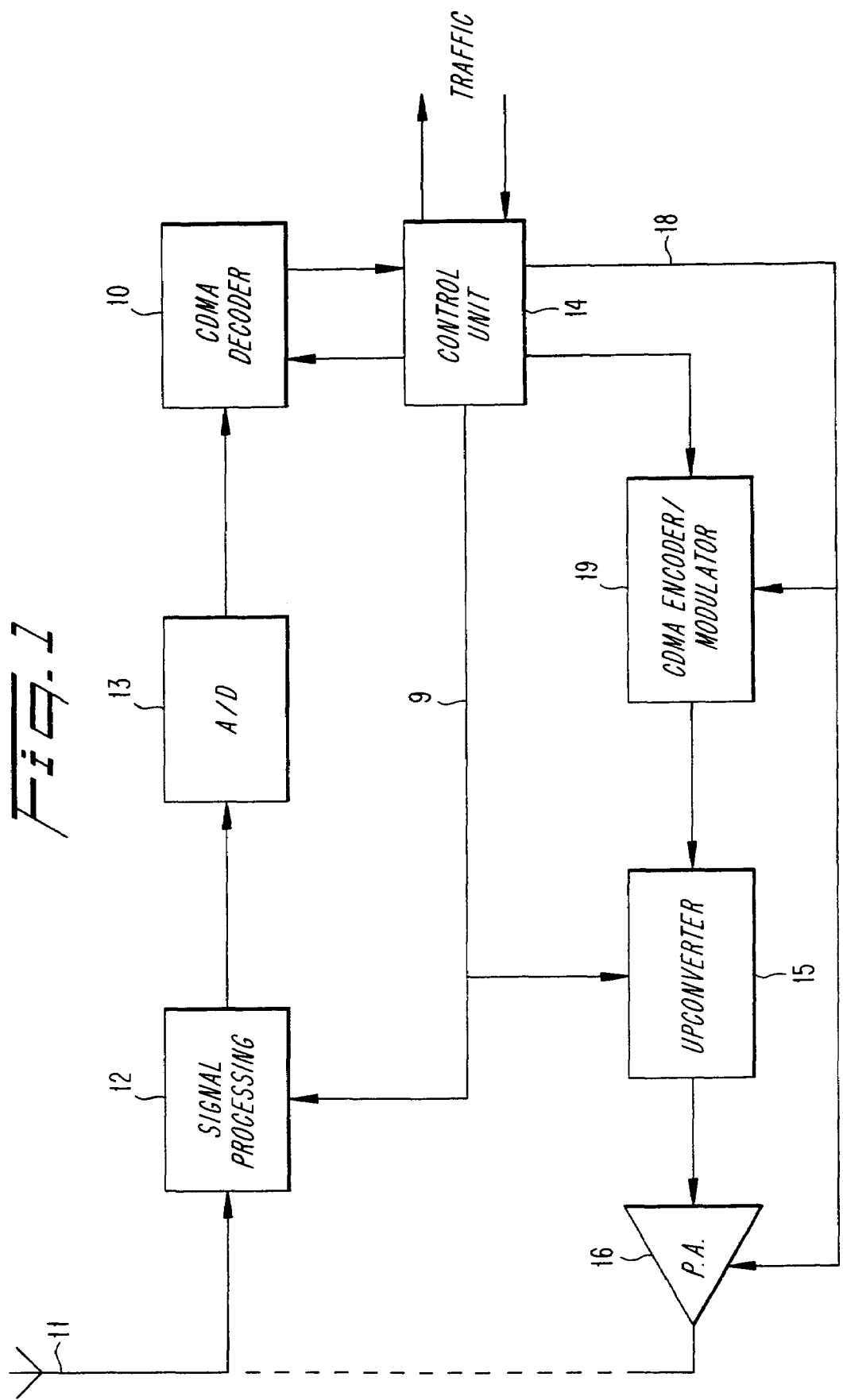
FIG. 1 illustrates a block diagram of a transmitter/receiver according to the present invention.

The general arrangement of an exemplary transmitter/receiver according to the invention is shown in FIG. 1. A CDMA decoder 10 receives a composite signal via an antenna 11, suitable amplifying, filtering and downconverting by signal processing circuitry 12 and A to D converter 13. The A to D converter 13 produces complex number outputs and can operate, for example, according to the logpolar principle described in U.S. Pat. No. 5,048,059, which is hereby incorporated by reference. The CDMA decoder is programmable by means of control unit 14 with any of a number of unique descrambling codes corresponding to the overlapping signals contained in the composite received signal. These descrambling codes are presented to the decoder in descending order of signal strength of the associated signal. The decoder furnishes decoded information and signal strength measurement information back to the control unit. Signal strength information can include amplitude and phase information, not only for the direct ray received from any station but also for delayed echoes. The direct ray and echo information is processed, for example by filtering and summing, to determine the total received energy in each signal. If signals are detected to have altered their position in signal strength sorted order, or are predicted to be about to do so, the control unit can alter the order of decoding in the next period. Decoded information contained in at least one of the decoded signals informs the control unit about the scrambling codes and/or frequencies of the cell from which that signal was generated and/or the codes and frequencies of neighboring cells. Similarly, outgoing traffic is encoded by CDMA encoder and modulator 19, upconverted for transmission by upconvertor 15 and amplified by power amplifier 16 before being transmitted from antenna 11. The output power level can be controlled by control unit 14 at both the encoder 19 and power amplifier 16 over control bus 18. The control unit 14 can also perform frequency programming for both received signals and transmission signals over control bus 9.

One way in which these scrambling codes can be constructed is to bitwise modulo-2 add one of a number (e.g., 7) of base station ID codes, as described in U.S. Pat. No. 5,353,352, entitled "Multiple Access Coding", which issued 4 Oct. 1994, and is hereby incorporated by reference. Moreover, one of the traffic channel ID codes can be reserved in each cell for use as a broadcast channel, calling channel or pilot channel as described in U.S. Pat. No. 5,377,183, entitled "Calling Channel in CDMA Communications System", which issued 27 Dec. 1994, and is hereby incorporated by reference. The signal using this code is always the strongest signal so the mobile receiver knows it shall attempt decoding of that signal before any other signals from the same cell.

The seven base station ID codes can be allocated to cells in a so-called 7-cell pattern such that no two adjacent cells use the same ID code. However, the use of codes will generally be repeated two cells or more away, so there can be ambiguity due to propagation anomalies as to whether a signal decoded using a particular code is from an adjacent cell or further away. Upon successfully decoding a broadcast channel, further information is obtained on the station ID to resolve this ambiguity. An advantage of restricting the number of base station ID codes is that the receiver only need attempt decoding with this limited number of codes, thereby accelerating the decoding process.

Normally, a receiver only need decode and subtract signals in descending signal strength order until it decodes its own traffic channel. If the mobile station is near the edge of its cell and thus possibly about to require handover to an adjacent cell, its traffic signal will be one of the stronger signals demodulated early, as will the calling channel of an adjacent cell so it is not necessary to decode many signals in order to acquire the desired information. If, on the other hand, the mobile station is near the center of its own cell, the base station will allocate less downlink power to signals sent to the mobile and its signal will be among the weather ones received. When this situation arises, the mobile station can deduce that it is not on the edge of its current cell and thus not about to require handover.

The mobile station can nevertheless attempt to demodulate the calling channel of a neighboring cell, even when the signal strength of such a calling channel is below that of the mobile station's traffic channel, by continuing to decode received signals after extracting its own traffic signal. In this way, the system can predict when the received signal strength of a relatively strong calling channel of a neighboring base station will exceed the signal strength of the mobile station's own signal, so that the stronger signal will be subtracted first.

When the mobile receiver detects from relative signal strengths that it is nearing a point where a handover might be appropriate, the base station is informed by data message from the mobile station about the other base stations the mobile station can hear and their relative signal strengths. This process of signal strength reporting can also be continuous even when handover is not imminent. In order for such control-type messages not to interrupt traffic flow, it is conventionally known to multiplex a lot bit rate data stream called the Slow Associated Control Channel (SACCH) with the higher bit rate traffic. It is also possible, if the need for handover becomes more urgent, to steal capacity from the traffic channel to send a high priority message. Conventionally, such a priority message channel is known as a Fast Associated Control Channel (FACCH).

In exemplary embodiments of the present invention, the base station or fixed network includes processing circuitry to decide, for each mobile station, when handover is necessary and to implement handover at such times. At least three forms of handover can be executed by a mobile station under control of the intelligent network controller as follows.

A first form, called an internal handover, occurs when the network decides to keep the mobile station connected to its current base station for traffic sharing or capacity optimization reasons, but to switch transmissions from the mobile station to another frequency or code. If a frequency change is commanded, a slight interruption in traffic will occur while the mobile station acquires synchronization on the new frequency.

A second form of handover is the transfer of a mobile station to another base station without a frequency change. This handover has the potential to be a so-called glitch-free or seamless handover that involves no interruption of traffic whatsoever. In fact, as discussed below, according to one exemplary embodiment of the invention a single mobile receiver establishes reception of the new base station before relinquishing the signal from the old base station. During this period where the mobile station is receiving its intended signal from both base stations, the receiver can use both decoded signals to obtain diversity gain. This type of system is also known as soft handover, macro-diversity, or transmit space diversity.

To establish communication with the second base station, the second base station is informed by the network to begin transmitting a signal for the mobile station. Since it could be disturbing for other mobile receivers already connected in the new cell if a new signal suddenly appeared as one of the lighter signal strengths, the new signal is preferably slowly ramped up from a lowest signal strength to a desired power level. This process can also be used when a call is set up from scratch and is known in this context as random access. Until handover is complete, the old base station remains in control of the mobile station's behavior, particularly with respect to controlling the mobile station's transmitter output power. In implementing power control during macro-diversity or soft handover, the controlling base station can receive information from the other base station or stations regarding the signal strength with which they receive the signal transmitted from the mobile station. Completion of handover occurs when control of the mobile station, including the power control function, is transferred from the old base to the new base. Macro-diversity operation can continue for a while, with the new base now as the master and the old base as the slave, until the mobile station is no longer at the boundary of the two cells and the old base station is informed that it can terminate transmission to that mobile, thereby releasing the code which can then be used for establishing a new call. As the sudden disappearance of a signal among the strongest could also disturb ongoing traffic, the signal is preferably ramped slowly down to a minimum power level before being turned off.

A third type of handover that can be effected is a frequency change upon changing base station. In this case, a seamless handover or macro-diversity operation cannot e achieved unless an internal handover of the first-described type had previously been made to the new frequency. The latter is preferable, but may not always be possible depending on the traffic load on the various frequencies in the two cells. Frequency and code allocation algorithms can be provided that attempt to distribute these resources to mobile stations according to position so as to achieve desirable loading patterns. Using such algorithms an advantage is provided by means of CDMA coding permitting many calls to take place on the same frequency, so that the mean time between new call set-up or clear-down requests is reduced to a few seconds. It then becomes possible for a handover system to request reservation of capacity on any frequency for use by a mobile station that is about to enter the cell, and such a request will normally be granted within a few seconds. The intelligent network controller also strives at call set-up to allocate frequencies so as to even out the loading on each frequency channel. Frequencies can be allocated or re-assigned by means of internal handovers based on which channel will suffer the least from interference from more distant stations. Using such adaptive channel allocation, the network can effectively transfer capacity on any channel from surrounding cells having light demand to a cell with a peak demands, thus achieving averaging of capacity demand over more than one cell, which provides an increase in useable capacity without risk of momentary overload becoming unacceptable.

Figure 2:
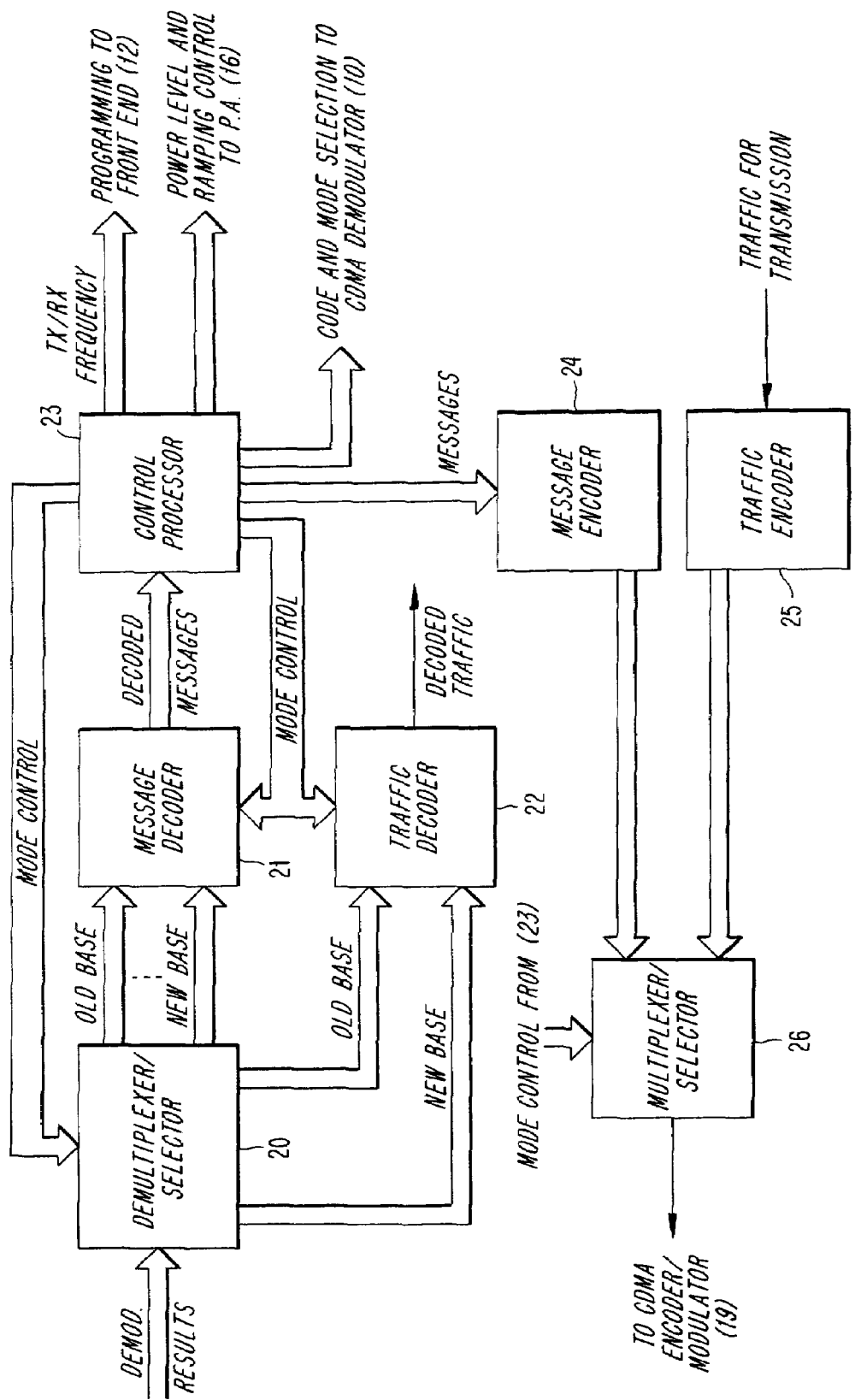
FIG. 2 illustrates the control unit of FIG. 1 in more detail.

The implementation of these above-described types of handovers according to the present invention is effected in the mobile station by control unit 14. Further details of control unit 14 are illustrated in FIG. 2. Demodulation results are fed from the CDMA decoder 10 to a demultiplexer or selector 20 in control unit 14. The demultiplexer is controlled by the control processor 23 to select either only data from the current base station with which the mobile station is in communication or data from both the current base station and a new base station to which handover is imminent. Selected data is fed to the traffic decoder 22 and the message decoder 21 which are also controlled by the control processor 23 to accept either data only from the current (old) base station or from both the old and new base stations. The message decoder 21 processes selected data so as to reduce transmission errors using both error correction decoding and diversity combination techniques and passes decoded messages to control processor 23. These messages indicate to the control processor 23 whether the mobile station shall operate in normal mode, (i.e. decoding traffic and messages from the current base station only), whether it shall operate in diversity mode, (i.e. decoding messages and traffic based on data received from the current base and another base station), or whether the mobile station shall execute a frequency change or transmit code change. Similarly, the control unit includes a message encoder 24 and a traffic encoder 25 for outgoing transmissions. The control processor 23 selects an output from either of these encoders by way of multiplexer 26 which is sent to the CDMA encoder/modulator 19.

The preferred type of handover is the above-described soft handover which does not involve even a momentary loss of traffic. The operation of a receiver in executing soft handovers according to the present invention will now be described.

A control message is transmitted from the current base station to the mobile station, indicating the CDMA code that a neighboring base station will use to transmit data to the mobile station. This is processed in control unit 14 as further detailed in FIG. 2 causing the mobile receiver to look for and demodulate the signal from the new base station. Because it is undesirable to suddenly start new transmissions at a high power level, the new base station preferably starts transmitting to the mobile at low power and gradually increases the power level to a predetermined value. The mobile station continues for the time being to transmit using the original CDMA code, but includes data indicating how well it is receiving the new base station. When the old base station determines from this data that the mobile station is receiving the new base station transmission sufficiently reliably, the old base station initiates a message instructing the mobile station to regard the new base station as its current base station. The old base station can then cease transmission using the original CDMA code. Because it is undesirable to suddenly terminate a high power transmission, the old base station preferably gradually reduces the power level of that CDMA code transmission to a lower power level before ceasing transmission and returning that code to a pool available for establishing new communications.

The operation of the mobile transmitter during soft handover is preferably analogous to that of the base station network. Initially, the mobile station continues to transmit using its original CDMA code. The current base station informs the new base station to look for and demodulate the mobile station's transmission using this code. When employing subtractive CDMA demodulation in which all signals are demodulated and subtracted in signal strength order, the new base station would most likely already have been demodulating the mobile signal. The new base station can exchange demodulated data with the old base, for the purposes of using the data diversity to obtain better error correction decoding. This exchange preferably takes place by means of fiber-optic data links between the base stations, carrying multiplexed data pertaining to a plurality of mobile stations, but can also take place via any other type of communication links such as coaxial landlines, trunks or dedicated microwave radio data links.

When the mobile station receives a message from its old base station notifying it to regard the new base station as its current base station, the mobile station starts transmitting to the new base station using the new base station's CDMA code. Since it is undesirable to start a transmission suddenly at high power, the mobile station preferably ramps up the power level of the new code from a low power level to the desired power level. The desired power level can, for example, be determined according to the method disclosed in U.S. Pat. No. 5,345,598, entitled "Duplex Power Control" which issued 6 Sep. 1994, and is hereby incorporated by reference. Therein, the power level is adjusted based on the relative signal strength the mobile station receives on its code from the new base station compared to other codes from that base station.

A preferred modulation method is a linear modulation method including both amplitude and phase modulation for best spectral containment. The mobile transmitter power amplifier for such modulation is thus of linear type, such as class-A, class-B or class-AB. Such an amplifier is not constrained to being able to transmit only one CDMA coded signal, but is able to transmit a plurality of superimposed signals, so long as their sum never exceeds the amplifier peak power capability. This ability can be employed by the mobile transmitter to permit initiation of transmission to the new base station using a new access code before terminating transmission to the old base station using the old access code. Since sudden termination of transmission using the old code is undesirable, the mobile station can gradually reduce the power level of transmission using the old CDMA code at the same time as it gradually increases the power level of transmission using the new code, in such a way that the sum of the two signals never exceeds the peak power capability of the transmitter. At the crossover point where both superimposed transmissions are of equal power, the peak signal amplitude of each must be halved for the sum never to exceed unity, and the power in each transmitted coed signal is thus ¼. The total power transmitted from the mobile station is thus halved, but since both base stations receive transmissions using both codes, quadruple diversity is in effect provided, more than compensating for this 3 dB reduction in mobile power. For this reason, it can be advantageous to prolong the period during which soft handover is in operation as long as a mobile station is near the edge of two cells. This mode of operation can be termed macrodiversity, and takes advantage of the CDMA receiver's ability to receive two or more CDMA codes simultaneously bearing the same information, and, conversely, the mobile CDMA transmitter's ability to transmit two CDMA coded signals bearing the same information.

When handover requires a frequency change because the new base station cannot provide a signal for the mobile station on the old frequency, it is not as feasible to achieve a handover without interruption of traffic flow. This is partly due to cost constraints in fabrication of the mobile station which dictate that only one frequency synthesizer be used jointly by both the transmitter and receiver. Given this limitation, it is not possible for the transmitter and receiver to change frequency at different times. If, on the other hand, two synthesizers are considered acceptable from a cost standpoint, the receiver frequency could be switched at a time when the downlink side of the conversation is silent, and the transmit frequency could be switched at a time when the uplink side of the conversation is silent.

In situations where a mobile station has a single frequency synthesizer it is, of course, desirable to take advantage of an opportunity to switch frequency when both sides of the conversation are silent. If this is not possible, however, the least perceived disruption in a conversation will occur if the frequency is switched just at the time one side or the other of the conversation becomes silent, as there can be a delay before the other party commences talking.

If such an opportunity does not arise before handover becomes urgent however, a handover is forced by transmitting from the current base station a channel change command to the mobile in place of speech traffic, the channel change command being a data message containing details of the frequency, new base station ID and new CDMA traffic code that the mobile station shall use. The mobile station then terminates transmission on the old frequency during a pause in conversation as described above, changes frequency, and then starts transmission on the new frequency. Meanwhile, the new base station is informed by the old base station to expect the mobile station's signal. In the event that both base stations are able to receive on both the old and new frequencies, space diversity reception, as previously described, can be provided on both the old and new frequencies to improve reception quality while the mobile station is in the handover region.

There is no point in the old and new base stations transmitting to the mobile station simultaneously on different frequencies however, as the mobile station, in contrast to the base station, is only equipped to receive on one frequency at a time. Ramping up the power level of the transmission from the new base using the new CDMA code can nevertheless be done before, or in parallel with, ramping down the power level of the old transmission so that both will in fact overlap for a short while and the interruption in traffic as the mobile changes frequency is not unnecessarily prolonged by having to wait for the new base station's transmission to appear.

A base station network for implementing handover as described above is illustrated in FIG. 3. A first base station 32 having an antenna system 30 and a CDMA transmitter/receiver system 31 is connected by communication links, for example fiber-optic lines, to one or more base station controllers 36. A second base station 35, having an analogous antenna 33 and transmitter/receiver 34, to which a mobile station in communication with the first base station will now communicate is also connected by similar links to the base station controller.

The base station controller can simply switch data through from one base to another under command of a switching center. If the controller operates in this manner, the diversity combination described above can be implemented in the first or second base station or both. Alternatively, the base station controller itself can perform the diversity combination or selection of data from two or more base stations. Moreover, error correction decoding subsequent to diversity combination can reside at base stations 32 and 35, at base station controller 36, or at the switching center. Likewise any digital speech decoding subsequent to error correction decoding can reside in any of these locations.

While the present invention has been described with reference to exemplary embodiments thereof, these exemplary embodiments are intended to be merely illustrative of the present invention rather than limitive. For example, although the above-described exemplary embodiments have been described in terms of mobile stations, the present invention can be implemented using any type of remote station (e.g., portable units). Moreover, while these exemplary embodiments implement macrodiversity using two differently coded CDMA transmissions in the context of the handover process, those skilled in the art will appreciate that such diversity transmissions can be provided during any stage of CDMA communication, including normal traffic communication. Thus, the present invention encompasses any and all modifications which are within the spirit and scope of the present invention as set forth in the appended claims.

The invention claimed is:

1. A method of mobile-assisted handover in a wireless network comprising:
    communicating with a first base station from a mobile station using a first CDMA spreading code before and during handover;
    receiving a control message from said first base station at said mobile station that identifies a second CDMA spreading code to support handover of said mobile station;
    communicating with a second base station from said mobile station using said second CDMA spreading code during and after handover;
    receiving a signal at the mobile station from the second base station on a same frequency as the first base station;
    determining a relative signal strength of the signal received from the second base station; and
    reporting the relative signal strength to the first base station to support handover determinations by said wireless network.

2. The method of claim 1 wherein said control message initiates handover from the first base station to the second base station.

3. The method of claim 2 further comprising reporting quality data from the mobile station to the first base station to indicate a reception quality of transmissions received by the mobile station from the second base station.

4. The method of claim 2 further comprising receiving a second handover message at the mobile station to indicate to the mobile station that the wireless network has transferred control from the first base station to the second base station.

5. The method of claim 4 further comprising, in response to receiving said second handover message, ramping down a transmit power level of signals transmitted from the mobile station to the first base station while ramping up a transmit power level of signals transmitted from the mobile station to the second base station to a desired transmit power level.

6. The method of claim 5 further comprising maintaining a sum of the transmit power levels of the signals transmitted from the mobile station to the first and second base stations below a maximum transmit power level.

7. The method of claim 5 wherein ramping down the transmit power level of signals transmitted from the mobile station to the first base station comprises ramping down the transmit power level of signals encoded with said first CDMA spreading code used to transmit to the first base station.

8. The method of claim 5 wherein ramping up the transmit power level of signals transmitted from the mobile station to the second base station to a desired transmit power level comprises ramping up the transmit power level of signals encoded with said second CDMA spreading code used to transmit to the second base station.

9. The method of claim 2 further comprising, in response to receiving said first handover message, continuing to respond to control messages from the first base station during handover, and responding to control messages from the second base station after handover is complete.

10. The method of claim 9 wherein continuing to respond to control messages from the first base station during handover comprises continuing to respond to power control commands from the first base station, and wherein responding to control messages from the second base station after handover is complete comprises responding to power control commands from the second base station, wherein said power control commands control a transmit power level of the mobile station.

11. The method of claim 1 further comprising diversity combining the signals received from the first and second base stations.

12. The method of claim 1 wherein receiving a signal at the mobile station from the second base station on a same frequency as the first base station comprises receiving a pilot signal at the mobile station from the second base station on the same frequency.

13. A method of operation at a mobile station to support mobile-assisted handover in a wireless network comprising:
operating under control of a first base station using a first CDMA spreading code; and
while operating under control of the first base station:
reporting signal strengths of one or more surrounding base stations transmitting on a same frequency as the first base station;
receiving a first handover message from the first base station that initiates handover by identifying a second base station from among the one or more surrounding base stations and that further identifies a second CDMA spreading code;
beginning reception of transmissions from the second base station using said second CDMA spreading code during and after handover while continuing to receive transmissions from the first base station using said first CDMA spreading code before and during handover responsive to receiving the first handover message;
reporting a signal quality to the first base station for transmissions received from the second base station; and
receiving a second handover message from the first base station that indicates a transfer of control from the first base station to the second base station; and
shifting from operating under control of the first base station to operating under control of the second base station responsive to receiving the second handover message.

14. The method of claim 13, wherein during handover the mobile station diversity combines decoded transmissions from the first and second base stations.

15. A mobile station configured for mobile-assisted handover in a wireless network, the mobile station comprising:
a receiver to receive signals from a first base station on a first frequency using a first CDMA spreading code before and during handover, and to receive signals from at least one second base station on the first frequency using a second CDMA spreading code during and after handover, said receiver further configured to receive a first handover message from the first base station that initiates handover from the first base station to the second base station and identifies the second CDMA spreading code;
a controller operatively connected to the receiver and configured to determine relative signal strengths of the signals received from the at least one second base station; and
a transmitter operatively connected to the controller to transmit signals to the first base station and to report the relative signal strengths of the signals received from the at least one second base station to the first base station to support handover determinations by said wireless network.

16. The mobile station of claim 15 wherein the mobile station is configured to determine a reception quality of signals received from the second base station and to report the reception quality to the first base station during handover.

17. The mobile station of claim 15 wherein the mobile station is configured to simultaneously decode signals received from the first base station using the first CDMA spreading code and decode signals received from the second base station using the second CDMA spreading code during handover.

18. The mobile station of claim 17 wherein the mobile station is configured to diversity combine the signals received from the first and second base stations during handover.

19. The mobile station of claim 15 wherein the receiver receives a second handover message from the first base station indicating to the mobile station that the wireless network has transferred control from the first base station to the second base station.

20. The mobile station of claim 19 wherein the mobile station is configured to ramp down a transmit power level of signals transmitted to the first base station while ramping up a transmit power level of signals transmitted to the second base station, in response to receiving the second handover message.

21. The mobile station of claim 20 wherein the mobile station is configured to maintain a sum of the transmit power levels of the signals transmitted to the first and second base stations below a maximum mobile station transmit power level.

22. The mobile station of claim 20 wherein the mobile station is configured to ramp down the transmit power level of signals transmitted to the first base station by ramping down the transmit power level of signals encoded with said first CDMA spreading code used by the mobile station to encode transmissions to the first base station.

23. The mobile station of claim 20 wherein the mobile station is configured to ramp up the transmit power level of signals transmitted to the second base station by ramping up the transmit power level of signals encoded with said second CDMA spreading code used by the mobile station to encode transmissions to the second base station.

* * * * *